United States Patent
Liu et al.

(10) Patent No.: US 12,330,305 B2
(45) Date of Patent: Jun. 17, 2025

(54) ROBOT SYSTEM AND METHOD FOR CONTROLLING SAME

(71) Applicant: OMRON Corporation, Kyoto (JP)

(72) Inventors: Zhiqiang Liu, Kyoto (JP); Yuki Tsuchihashi, Kyoto (JP); Masahiro Murai, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 196 days.

(21) Appl. No.: 18/173,137

(22) Filed: Feb. 23, 2023

(65) Prior Publication Data

US 2023/0286145 A1  Sep. 14, 2023

(30) Foreign Application Priority Data

Mar. 11, 2022  (JP) ................................ 2022-038609

(51) Int. Cl.
  *B25J 9/00* (2006.01)
  *B25J 9/16* (2006.01)
  *B25J 13/08* (2006.01)

(52) U.S. Cl.
  CPC ........... *B25J 9/1633* (2013.01); *B25J 9/1687* (2013.01); *B25J 13/082* (2013.01)

(58) Field of Classification Search
  CPC ...... B25J 9/1633; B25J 9/1687; B25J 13/082; B25J 19/02; B25J 9/1694; B25J 11/00; G05B 2219/40032
  See application file for complete search history.

(56) References Cited

U.S. PATENT DOCUMENTS

| | | | | |
|---|---|---|---|---|
| 2005/0113971 | A1* | 5/2005 | Zhang | B25J 9/1687 700/245 |
| 2007/0087609 | A1 | 4/2007 | Isotani et al. | |
| 2008/0267737 | A1* | 10/2008 | Hatanaka | B25J 9/1687 901/27 |
| 2008/0312769 | A1 | 12/2008 | Sato et al. | |

(Continued)

FOREIGN PATENT DOCUMENTS

| | | | | |
|---|---|---|---|---|
| DE | 102011011660 | A1 * | 9/2011 | B25J 9/1687 |
| EP | 2002945 | A1 * | 12/2008 | B25J 9/1633 |

(Continued)

OTHER PUBLICATIONS

Extended European Search Report issued in European Appln. No. 23157880.8, mailed Sep. 6, 2023.

*Primary Examiner* — Ramon A. Mercado
*Assistant Examiner* — Shaheda Hoque
(74) *Attorney, Agent, or Firm* — ROSSI, KIMMS & McDOWELL LLP

(57) ABSTRACT

A technique automates robotic assembly of two parts with a fastener structure including an engaging portion and a receiving portion. A robot system includes a robot that grips a workpiece, a force sensor located on the robot to measure a force and a moment acting on the workpiece, and a controller that controls the robot. The controller monitors, while moving the workpiece in a direction along a first axis and inserting the workpiece into a part, a change in a force F in the direction along the first axis and a change in a moment M about a second axis perpendicular to the first axis measured by the force sensor to determine a state of assembly of the workpiece with the part.

9 Claims, 6 Drawing Sheets

(56) References Cited

U.S. PATENT DOCUMENTS

| | | | |
|---|---|---|---|
| 2011/0225787 A1* | 9/2011 | Sato | B25J 9/1687 |
| | | | 29/407.01 |
| 2015/0174760 A1* | 6/2015 | Fukuda | B25J 9/1687 |
| | | | 700/260 |
| 2018/0043540 A1* | 2/2018 | Satou | B25J 9/1633 |
| 2019/0283250 A1 | 9/2019 | Iwai et al. | |
| 2021/0001486 A1 | 1/2021 | Salem et al. | |

FOREIGN PATENT DOCUMENTS

| | | | | |
|---|---|---|---|---|
| EP | 3539729 A1 * | 9/2019 | | B25J 11/005 |
| JP | 2007111794 A | 5/2007 | | |
| JP | 2008221387 A * | 9/2008 | | |
| JP | 2010137299 A * | 6/2010 | | |
| JP | 2012086341 A * | 5/2012 | | |
| JP | 2012232384 A * | 11/2012 | | |
| JP | 2022102652 A * | 7/2022 | | B60J 1/17 |
| WO | WO-2022024976 A1 * | 2/2022 | | B25J 9/1633 |

* cited by examiner

ROBOT SYSTEM AND METHOD FOR CONTROLLING SAME

CROSS-REFERENCE TO RELATED APPLICATION

This application claims priority to Japanese Patent Application No. 2022-038609 filed on Mar. 11, 2022, the contents of which are incorporated herein by reference.

TECHNICAL FIELD

The present invention relates to a robot system for assembling parts.

BACKGROUND ART

Robots are used for assembling workpieces at factories promoting factory automation (FA). For example, Patent Literature 1 describes a robot system for assembling parts of automobile doors.

CITATION LIST

Patent Literature

Patent Literature 1: Japanese Unexamined Patent Application Publication No. 2007-111794

SUMMARY

Technical Problem

Many industrial products use fastener structures having a male part inserted into a female part to allow an engagement portion of the male part to be engaged (hooked or fitted) with a receiving portion of the female part to prevent the male part from slipping off. Such fastener structures include clips, engagement tabs, fitting structures using recesses and protrusions, and snap-fits. Assembly of parts including such fastener structures is not easy to automate using robots, partly due to the difficulty to mechanically determine whether the engagement portion and the receiving portion are correctly engaged with each other.

Patent Literature 1 describes a method for fastening a door with a clip with a robot, including measuring a pressing reaction force using a pressing pad on a distal end of the robot and determining that the clip has fitted into a clip hole based on a significant decrease in the pressing reaction force. This method of determination may be used to solve the above issue, or specifically to mechanically determine the state of engagement. However, experiments conducted by the inventors revealed that an actual assembly process may be more complicated.

As the male part is pressed into the female part while the engagement portion or the receiving portion is elastically being deformed, the pressing reaction force increases gradually. The pressing reaction force then decreases significantly once the engagement portion and the receiving portion are released from contact with each other at the time when these portions are engaged with each other. This is observed as a significant decrease in the pressing reaction force observed when the male part is inserted into the female part at a correct position with a correct orientation. However, manufacturing variations in the clearances between the male and female parts and in the shapes of the engaging portion and the receiving portion may prevent any significant decrease from occurring in the pressing reaction force, thus causing a failure to detect engagement between the male and female parts. For example, a large clearance between the male part and the female part may cause the male part to be inserted into the female part obliquely and may cause a portion of the male part other than the engagement portion to come in contact with the female part or to slide before the engagement portion is engaged with the receiving portion. This may prevent any significant decrease from occurring in the pressing reaction force. Without detecting engagement between the engaging portion and the receiving portion, the operation of the robot inserting the male part cannot be stopped timely with the method described in Patent Literature 1. The male part may be pressed excessively until the male or female part is damaged. Similarly, when the male part is inserted obliquely to the female part in certain situations, the male part and the female part may interfere with each other, thus causing an assembly failure or damaging each other. This seems noticeable in structures with a relatively small clearance (gap) between the male and female parts, such as connectors.

In response to the above issue, one or more aspects of the present invention are directed to a technique for automating robotic assembly of parts with a fastener structure including an engaging portion and a receiving portion.

Solution to Problem

A robot system according to an aspect of the present disclosure is a robot system for inserting a workpiece including an engagement portion into a part including a receiving portion corresponding to the engagement portion to assemble the workpiece with the part. The robot system includes a robot that grips the workpiece, a force sensor located on the robot to measure a force and a moment acting on the workpiece, and a controller that controls the robot. The controller monitors, while moving the workpiece in a direction along a first axis and inserting the workpiece into the part, a change in a force F in the direction along the first axis and a change in a moment M about a second axis perpendicular to the first axis measured by the force sensor to determine a state of assembly of the workpiece with the part.

The controller may determine a state of engagement between the engagement portion and the receiving portion based on the change in the force F.

The controller may determine an appropriateness of an insertion orientation of the workpiece relative to the part based on the moment M.

The controller may determine that the engagement portion and the receiving portion are engaged with each other and that the workpiece is assembled with the part normally in response to a decrease in the force F relative to a maximum value Fmax of the force F recorded at and after a predetermined determination start point exceeding a first threshold.

The controller may determine that the workpiece is assembled with the part normally in response to the moment M being less than a second threshold and a predetermined time elapsing from the predetermined determination start point before the decrease in the force F relative to the maximum value Fmax of the force F exceeding the first threshold.

The controller may determine that assembly of the workpiece is unsuccessful in response to the moment M remaining greater than or equal to the second threshold and the predetermined time elapsing from the predetermined determination start point before the decrease in the force F relative to the maximum value Fmax of the force F exceeding the first threshold.

The predetermined time may be set based on a time taken for the workpiece to reach an insertion end position from the predetermined determination start point.

The controller may perform a recovery operation to correct an insertion orientation of the workpiece in response to the moment M being greater than or equal to the second threshold before the decrease in the force F relative to the maximum value Fmax of the force F exceeding the first threshold.

The recovery operation may include rotating the workpiece in a direction to reduce the moment M.

The recovery operation may include moving the workpiece in a direction opposite to an insertion direction of the workpiece.

A method according to another aspect of the present disclosure is a method for controlling a robot system for inserting a workpiece including an engagement portion into a part including a receiving portion corresponding to the engagement portion to assemble the workpiece with the part. The method includes controlling a robot gripping the workpiece to move the workpiece in a direction along a first axis and insert the workpiece into the part, measuring a force F in the direction along the first axis and a moment M about a second axis perpendicular to the first axis using a force sensor located on the robot, and determining a state of assembly of the workpiece with the part by monitoring a change in the force F and a change in the moment M while inserting the workpiece.

One or more aspects of the present invention may be directed to a robot system including at least one or more of the above elements or functions, or to a robot, a robot arm, a manipulator, a robot controller, or a FA system. One or more aspects of the present invention may also be directed to a method for controlling a robot system including at least one or more of the above processes, or a method for assembly or manufacture using a robot system. One or more aspects of the present invention may further be directed to a program for implementing the above method, or a non-transitory computer-readable storage medium storing the program. The above elements and processes may be combined with one another in any possible manner to form one or more aspects of the present invention.

Advantageous Effects

The technique according to the above aspects of the present invention can automate robotic assembly of parts with a fastener structure including an engaging portion and a receiving portion.

DETAILED DESCRIPTION

<Example Use>

Figure 1:
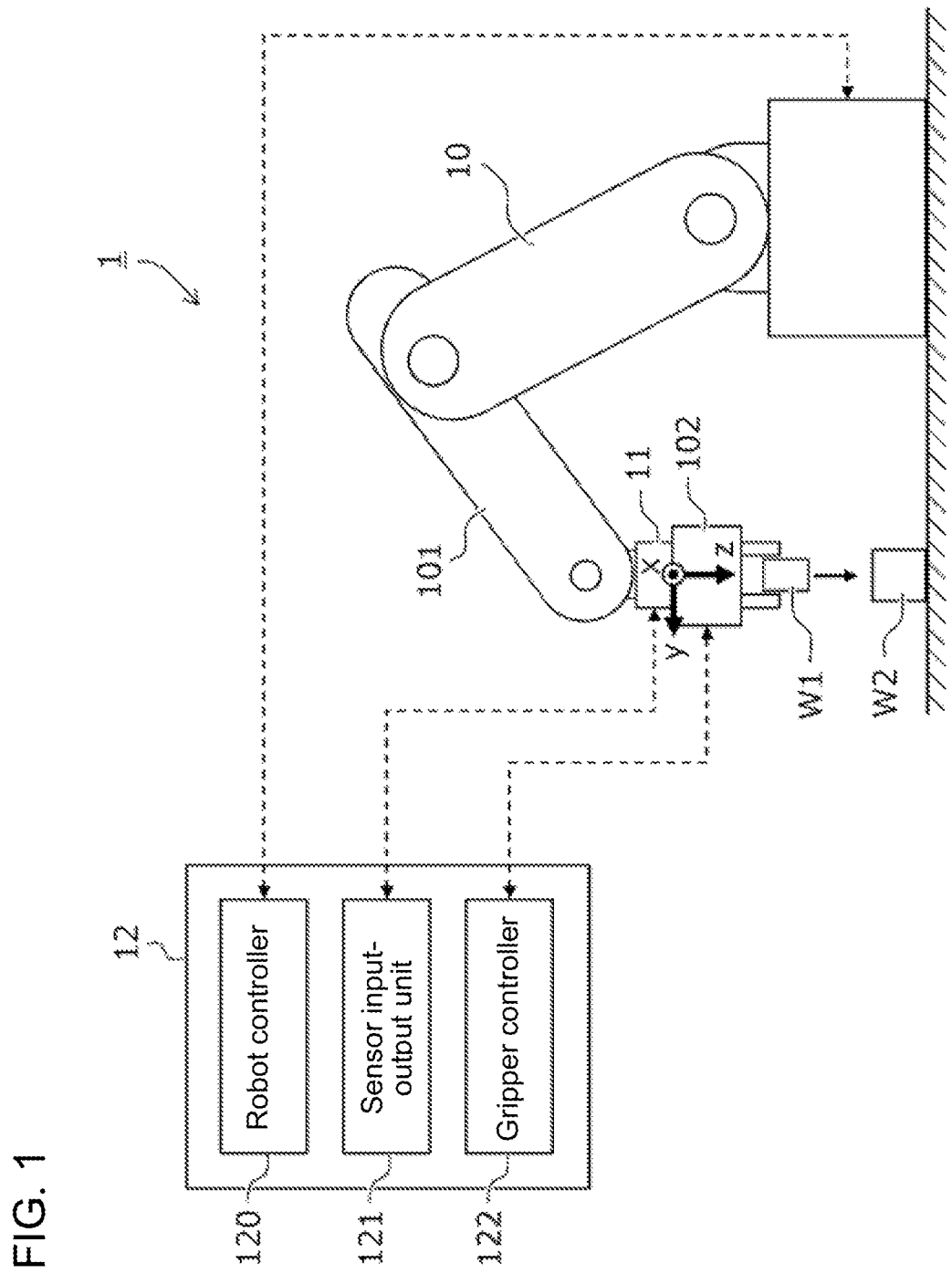
FIG. 1 is a schematic diagram of a robot system.

One example use of the present invention will now be described with reference to FIGS. 1 to 3.

A robot system 1 is an industrial machine for assembling parts. The robot system 1 mainly includes a robot 10 and a controller 12 that controls the robot 10. The robot 10 includes a gripper 102 for gripping a workpiece at a distal end of a robot arm 101. The gripper 102 includes a force sensor 11 at its basal end. The controller 12 is connected to the robot 10 either with wires or wirelessly and can, for example, transmit a control signal to the robot 10 and receive an output or an encoder signal from the force sensor 11 included in the robot 10.

In the example described below, the robot system 1 is used for assembling two parts 21 and 22 shown in FIG. 2. In FIG. 2, the part 22 is shown in a cross section. The parts 21 and 22 may be cable connectors that are assembled together when the male part 21 is inserted (pressed) into the female part 22. An engagement portion 23 in the part 21 is engaged with a receiving portion 24 in the part 22 to fasten the two parts 21 and 22 together (to prevent these parts from slipping off). For the robot system 1 to assemble such two parts together, one part is held stationary with, for example, a fixture, and the other part is gripped with the gripper 102 and is inserted into the stationary part. Hereafter, the part gripped with the gripper 102 (the part to be moved) will be referred to as a workpiece W1, and the stationary part will be referred to as a part W2 for ease of explanation. The workpiece W1 may be the male part 21 or the female part 22.

Figure 3:
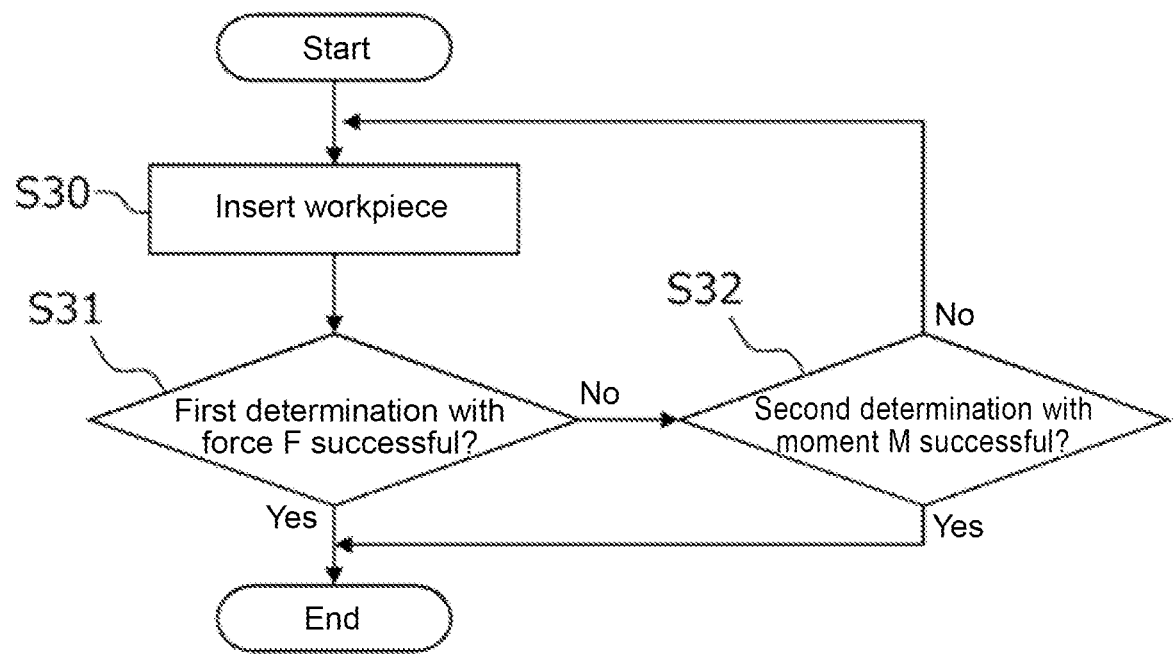
FIG. 3 is a flowchart showing an assembly process performed by a robot system.

FIG. 3 is a flowchart schematically showing an assembly process performed by the robot system 1.

The controller 12 moves the workpiece W1 in a direction along a first axis (insertion direction) at a predetermined speed to insert the workpiece W1 into a hole in the part W2 (step S30). During the insertion, the controller 12 monitors a measurement value obtained by the force sensor 11 to determine the state of assembly of the workpiece W1 with the part W2. In first determination (step S31), the controller 12 determines the state of engagement between the engagement portion 23 and the receiving portion 24 based on a change in a force F in the first axis direction measured by the force sensor 11. When the engagement is determined to be complete in the first determination (Yes in step S31), the controller 12 determines that the workpiece W1 is assembled with the part W2 normally and ends the assembly. When the engagement is determined to be incomplete in the first determination (No in step S31), second determination (step S32) is performed. In the second determination, the controller 12 determines the appropriateness of the insertion orientation of the workpiece W1 when the workpiece W1 is inserted into the part W2 based on a moment M about a second axis (perpendicular to the first axis) measured by the force sensor 11. When the orientation of the workpiece W1 being inserted is appropriate and a predetermined time has elapsed from a determination start point, the insertion is determined to be complete (Yes in step S32).

As described above, the system determines the state of assembly of the workpiece W1 with the part W2 by combining the first determination about the engagement state based on the change in the force F and the second determination about the appropriateness of the insertion orientation of the workpiece W1 based on the moment M. When no significant change is observed in the force F during engagement between the engagement portion 23 and the receiving portion 24 due to manufacturing variations in the workpiece W1 and the part W2 or due to tilting of the workpiece W1, the second determination can determine whether the insertion is complete. The system can thus prevent excess pressing of the workpiece W1 and avoid damaging parts. The system evaluates the appropriateness of the insertion orientation of the workpiece W1 in the second determination to prevent excess interference between the workpiece W1 and the part W2 and to avoid damaging these parts, as well as, for example, to correct the insertion orientation of the workpiece W1.

Embodiment

An embodiment of the present invention will now be described in detail.
(System Configuration)

Figure 2:
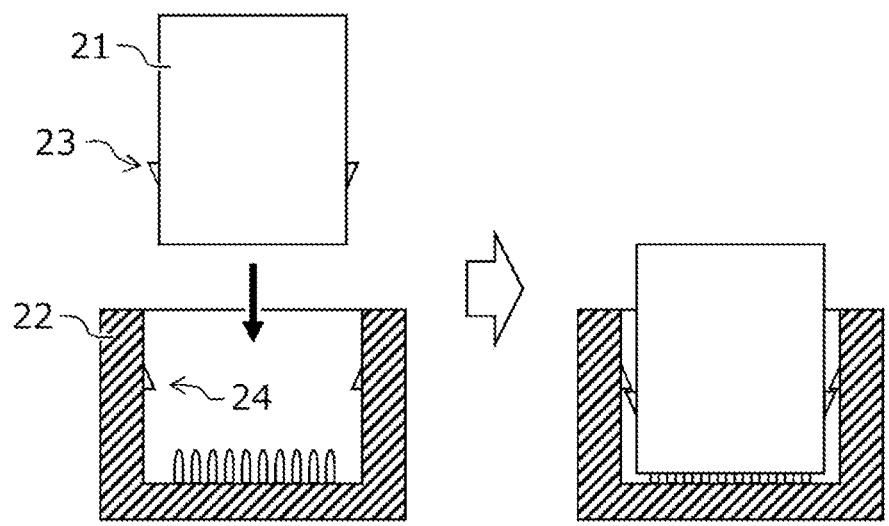
FIG. 2 is a diagram showing example parts to be assembled.

As shown in FIG. 1, the robot system 1 includes the robot 10, the force sensor 11, and the controller 12.

The robot 10 includes the robot arm 101 and the gripper 102 attached at the distal end of the robot arm 101. In the present embodiment, the robot arm 101 is, for example, a vertically articulated robot with six degrees of freedom. The robot arm 101 may be any other robot that can translate in a direction in which a workpiece W1 is inserted (direction along a first axis) and rotate about an axis perpendicular to the insertion direction (second axis). For example, the robot arm 101 may be a horizontal articulated robot such as a Selective Compliance Assembly Robot Arm (SCARA) robot or a parallel link robot. The gripper 102, which is also referred to as a robot hand or an end-effector, is a device for holding the workpiece W1. The method of holding the workpiece W1 may be any method including clamping the workpiece W1 with multiple tabs, sucking the workpiece W1 with air, or attracting the workpiece W1 with magnets.

The force sensor 11 is a six-axis sensor located on a basal end of the gripper 102 for measuring a force and a moment acting on the workpiece W1. As shown in FIG. 1, a gripper coordinate system xyz may have its origin at the center of the basal end of the gripper 102, z-axis in the direction of a distal end of the gripper 102 (the same direction as the insertion direction of the workpiece W1), and x-axis and y-axis in the direction perpendicular to z-axis. With reference to the gripper xyz coordinate system, the force sensor 11 can measure six physical quantities, or specifically, a force Fx in x-direction, a force Fy in y-direction, a force Fz in z-direction, a moment Mx about x-axis, a moment My about y-axis, and a moment Mz about z-axis. The force sensor 11 outputs measurement values that are then received by the controller 12.

The controller 12 is a computer for controlling the robot 10. The controller 12 includes, for example, a programmable logic controller (PLC). As shown in FIG. 1, the controller 12 in the present embodiment includes a robot controller 120 that controls the robot arm 101, a sensor input-output unit 121 that receives measurement data from the force sensor 11, and a gripper controller 122 that controls the gripper 102. The controller 12 is connected to the robot 10 through an industrial network such as Ethernet for control automation technology (EtherCAT), and to the force sensor 11 and the gripper 102 with, for example, a serial cable. The connection between the devices is not limited to these examples and may be wireless, or may use a controller built-in robot including the controller 12 integral with the robot 10.

(Assembly Example)

Figure 4:
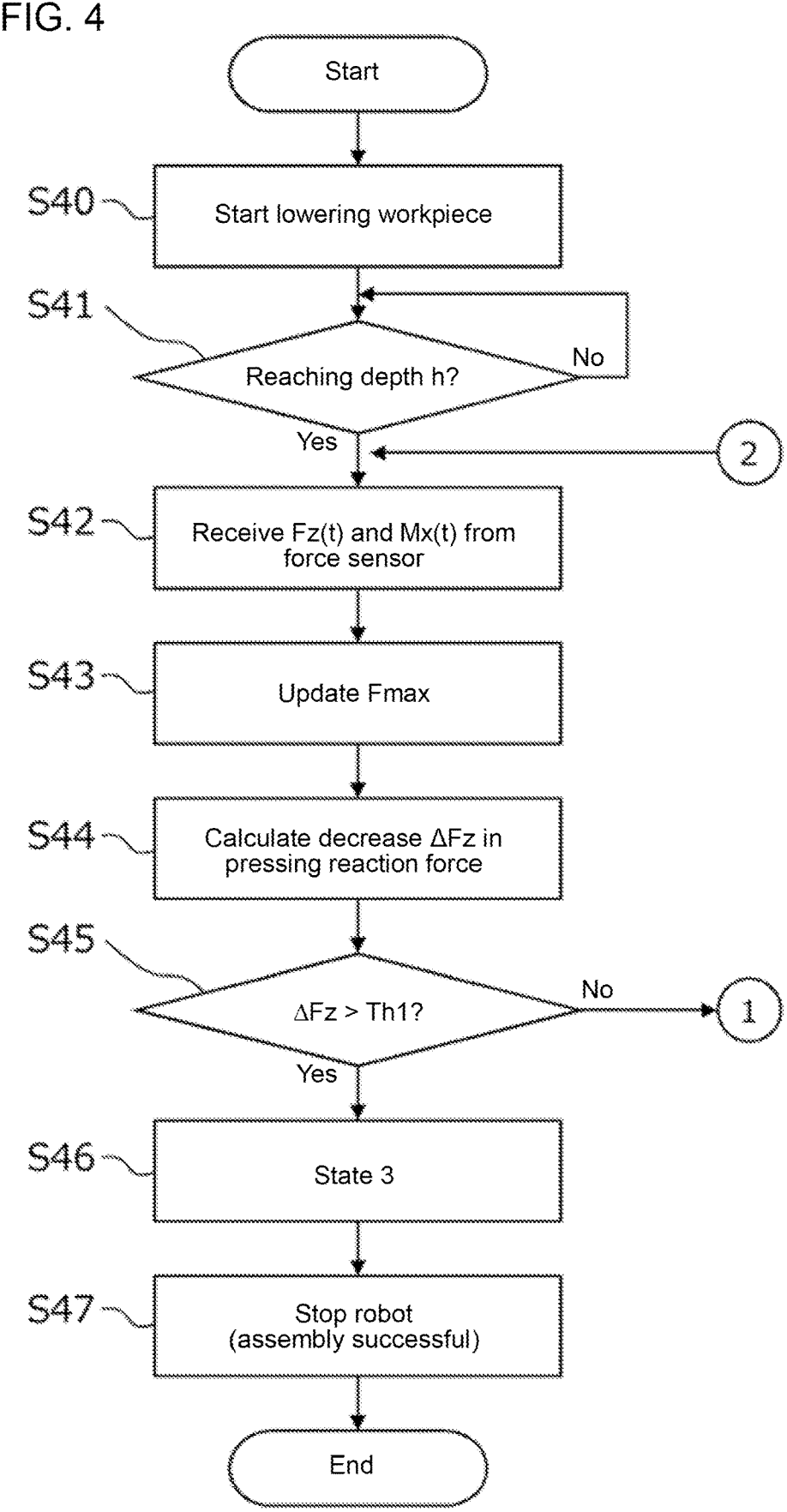
FIG. 4 is a flowchart showing the details of an example assembly process performed by the robot system.
Figure 5:
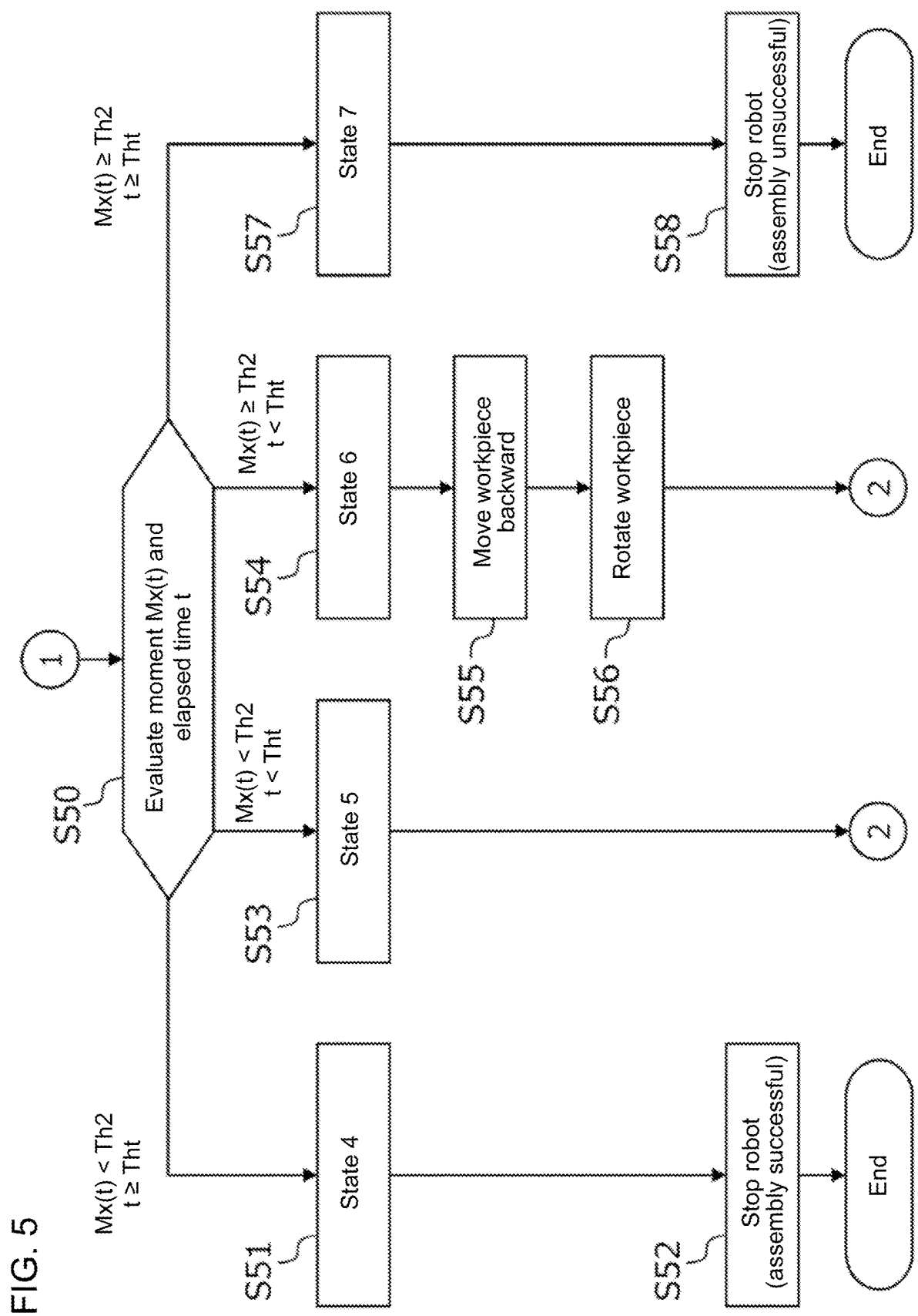
FIG. 5 is a flowchart showing the details of an example assembly process performed by the robot system.
Figure 6:
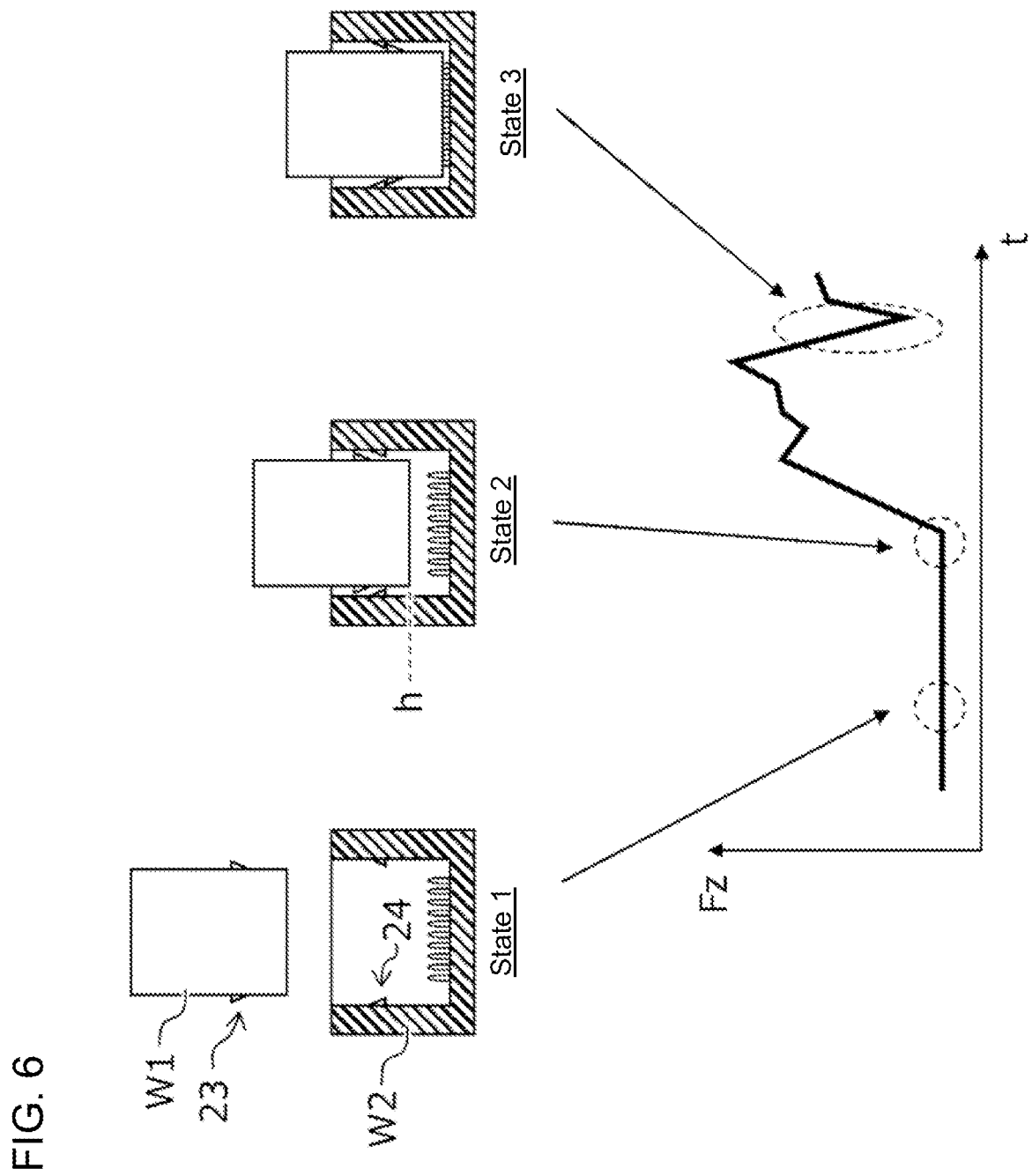
FIG. 6 is a diagram describing the relationship between a state of a workpiece and a pressing reaction force.
Figure 7:
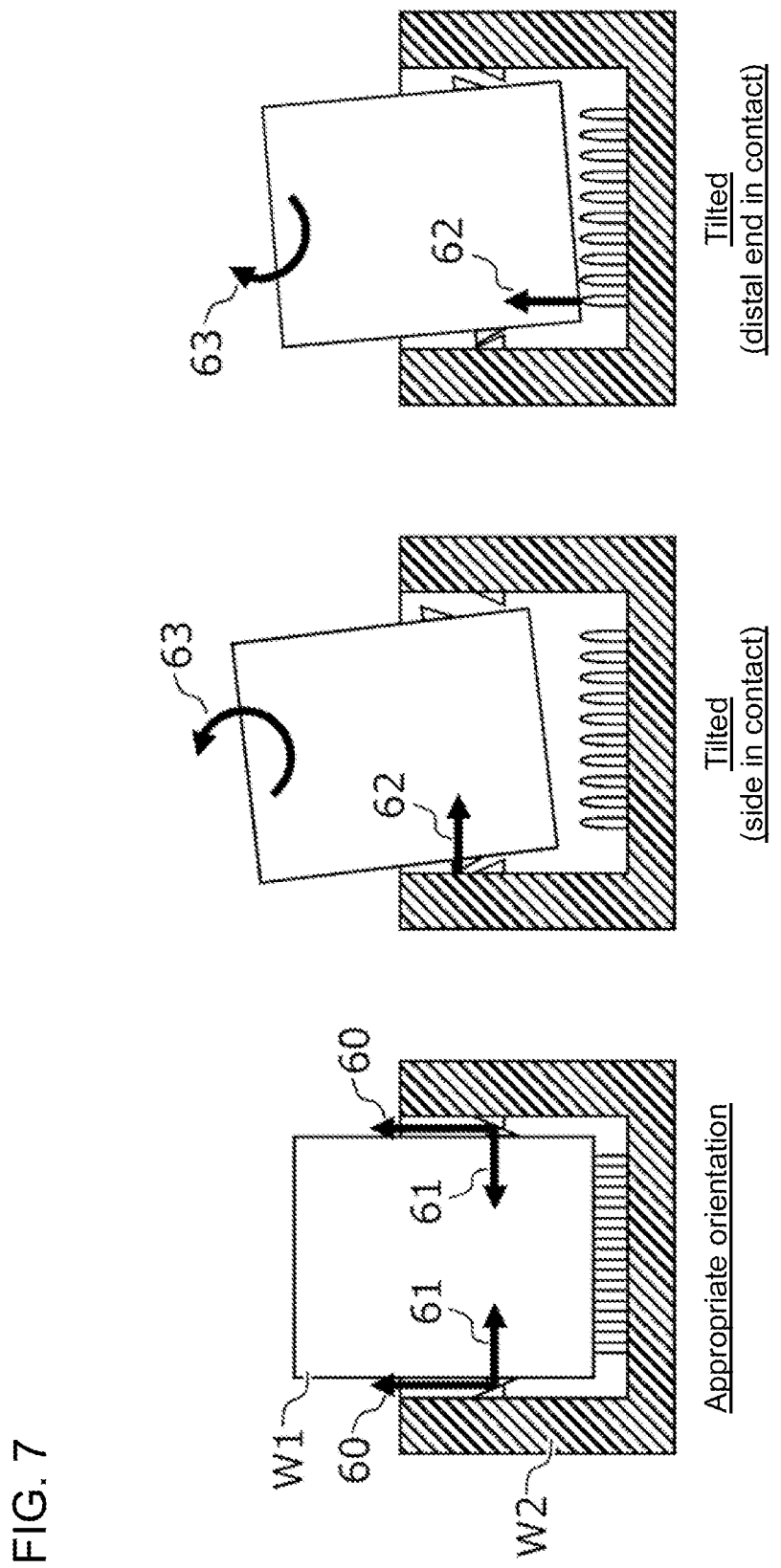
FIG. 7 is a diagram describing the relationship between a state of a workpiece and a moment.

An assembly process for parts performed by the robot system 1 according to the present embodiment will be described with reference to FIGS. 4 to 7. FIGS. 4 and 5 are flowcharts each showing the details of the assembly process. FIG. 6 is a diagram describing the relationship between the state of the workpiece W1 and a pressing reaction force. FIG. 7 is a diagram describing the relationship between the state of the workpiece W1 and the moment.

The assembly process shown in FIG. 4 follows the preliminarily processes such as holding the part W2 stationary, gripping the workpiece W1 with the gripper 102, and moving the workpiece W1 to a position at which the workpiece W1 starts being inserted (state 1 in FIG. 6) with the robot 10.

The controller 12 translates the workpiece W1 from an insertion start position downward in z-direction at a constant speed and inserts the workpiece W1 into a hole in the part W2 (step S40). When the workpiece W1 reaches a predetermined depth h, the controller 12 starts subsequent determination (step S41). The depth h may be set to a value with which the engagement portion 23 in the workpiece W1 is narrowly out of contact with a receiving portion 24 in the part W2 (a depth immediately before the two portions come into contact with each other). The depth h is referred to as a determination start position. The time when the workpiece W1 reaches the depth h is referred to as a determination start point. In state 2 in FIG. 6, the workpiece W1 is at the determination start position.

In response to the start of determination, the controller 12 receives measurement values from the force sensor 11 at regular time intervals (step S42). In the present embodiment, the controller 12 monitors two measurement values, or a force Fz(t) in z-direction and a moment Mx(t) about x-axis. In the present embodiment, t refers to the time that has elapsed from the determination start point, z-axis is an example of the first axis, and x-axis is an example of the second axis. The force Fz(t) is a pressing reaction force from the part W2 acting on the workpiece W1. Instead of the moment Mx(t) about x-axis, a moment My(t) about y-axis, or both moments Mx(t) and My(t) may be used in the determination.

The controller 12 stores, in a memory, a maximum value Fmax of the pressing reaction force in z-direction recorded after the determination start point. When a newly received value Fz(t) is greater than the maximum value Fmax, the maximum value Fmax in the memory is updated to the value Fz(t) (step S43).

In step S44, the controller 12 calculates a decrease $\Delta Fz$ in the pressing reaction force at time t using the formula below. The decrease $\Delta Fz$ shows a decrease in the force Fz relative to the maximum value Fmax recorded after the determination start point.

$$\Delta Fz = Fmax - Fz(t)$$

When the decrease $\Delta Fz$ exceeds a first threshold Th1 (Yes in step S45), the controller 12 determines that the workpiece W1 is in state 3 (step S46). In state 3 shown in FIG. 6, the engagement portion 23 in the workpiece W1 is engaged with the receiving portion 24 in the part W2. In this state, the workpiece W1 is assembled with the part W2 normally. The controller 12 determines the assembly as being successful and stops lowering the robot 10 (step S47). The threshold Th1 may be set to a value of about 60 to 80% of the decrease in the force Fz observed when the engagement portion 23 is engaged with the receiving portion 24 normally. The decrease in the force Fz varies depending on the types and structures of the workpiece W1 and the part W2. The controller 12 may thus learn the decrease in the force Fz and the threshold Th1 through a test using multiple samples.

When the decrease ΔFz does not exceed the first threshold Th1 (No in step S45), the controller 12 evaluates the moment Mx(t) and the time t that has elapsed from the determination start point (step S50). FIG. 7 is a diagram describing the relationship between the orientation of the workpiece W1 and the moment Mx. When the workpiece W1 is inserted with an appropriate orientation, a force 60 upward in z-direction alone acts on the workpiece W1 (a y-direction force 61 achieves equilibrium on both sides of the workpiece W1 and is cancelled) and no moment Mx occurs. However, when the workpiece W1 is inserted obliquely and a part of the workpiece W1 comes in contact with the part W2, a reaction force 62 acts on the workpiece W1 at the contact point, and a moment 63 occurs in the workpiece W1. The moment Mx (or My) is evaluated to determine whether the workpiece W1 has been inserted with an appropriate orientation. The time t that has elapsed from the determination start point corresponds to an insertion amount of the workpiece W1 (when the workpiece W1 is inserted at a constant speed). Thus, the time t is monitored to determine whether the workpiece W1 has been inserted sufficiently.

When the moment Mx(t) is less than a second threshold Th2, and a predetermined time Tht has elapsed from the determination start point, or when $Mx(t) < Th2$ and $t \geq Tht$, the controller 12 determines that the workpiece W1 is in state 4 (step S51). In state 4, the workpiece W1 is at the insertion orientation within an allowable range and has been inserted with a sufficient amount of insertion. Although no decrease in the force Fz during engagement is detected in certain situations, the assembly can be determined successful for the workpiece W1 in state 4. The controller 12 advances the processing to step S52 and stops lowering the robot 10. The threshold Th2 may be determined based on, for example, the load capacity of the workpiece W1. The predetermined time Tht may be determined based on the time taken for the workpiece W1 to reach an insertion end position from the determination start point.

When the moment Mx(t) is less than the second threshold Th2 and the predetermined time Tht has not elapsed, or when $Mx(t) < Th2$ and $t < Tht$, the controller 12 determines that the workpiece W1 is in state 5 (step S53). In state 5, the insertion orientation of the workpiece W1 is within the allowable range, and the workpiece W1 has not reached the insertion end position yet. In this case, the controller 12 returns to step S42 in FIG. 4 to continue the insertion.

When the moment Mx(t) is greater than or equal to the second threshold Th2, but the predetermined time Tht has not elapsed, or when $Mx(t) \geq Th2$ and $t < Tht$, the controller 12 determines that the workpiece W1 is in state 6 (step S54). In state 6, the insertion orientation of the workpiece W1 is out of the allowable range. In this case, the controller 12 performs a recovery operation to correct the insertion orientation of the workpiece W1. More specifically, the controller 12 moves the workpiece W1 slightly backward by moving the workpiece W1 in a direction opposite to the insertion direction (upward in z-direction) by a predetermined amount (step S55) and rotates the workpiece W1 in a direction to reduce the moment Mx(t) by a predetermined angle (step S56). The controller 12 then returns to step S42 in FIG. 4 to continue the insertion. The recovery operation allows reinsertion of the workpiece W1 with an appropriate orientation to increase the success rate of assembly. In the present embodiment, the workpiece W1 is first moved backward to be separate from the part W2. This can prevent damaging or breaking of the workpiece W1 when the workpiece W1 rotates to facilitate the recovery operation.

When the moment Mx(t) is greater than or equal to the second threshold Th2, and the predetermined time Tht has elapsed, or when $Mx(t) \geq Th2$ and $t \geq Tht$, the controller 12 determines that the workpiece W1 is in state 7 (step S57). In state 7, the insertion orientation of the workpiece W1 is out of the allowable range and the recovery operation for correction has been unsuccessful. The controller 12 determines the assembly of the workpiece W1 as being unsuccessful and stops the robot 10 (step S58).

The system determines the state of assembly of the workpiece W1 with the part W1 by combining the first determination with the force Fz and the second determination with the moment Mx. Thus, completion (success) or a failure of the assembly may be determined with high accuracy independently of manufacturing variations in the workpiece W1 and the part W2, or tilting of the workpiece W1. When the insertion orientation of the workpiece W1 is inappropriate, correction is attempted automatically. The system thus causes the robot 10 to automatically assemble parts with the fastener structure including the engaging portion and the receiving portion.

<Others>

The above embodiment describes exemplary structures according to one or more aspects of the present invention. The present invention is not limited to the specific embodiment described above, but may be modified variously within the scope of the technical ideas of the invention. For example, the workpiece W1 is the male part in the above embodiment. However, the part W2 may be the male part. The flowcharts in the above embodiment are examples, and the order of processing and the state classification may be changed as appropriate.

APPENDIXES

1. A robot system (1) for inserting a workpiece (W1) including an engagement portion (23) into a part (W2) including a receiving portion (24) corresponding to the engagement portion (23) to assemble the workpiece (W1) with the part (W2), the robot system (1) comprising:
   a robot (10) configured to grip the workpiece (W1);
   a force sensor (11) located on the robot (10) to measure a force and a moment acting on the workpiece (W1); and
   a controller (12) configured to control the robot (10),
   wherein the controller (12) monitors, while moving the workpiece (W1) in a direction along a first axis and inserting the workpiece (W1) into the part (W2), a change in a force F in the direction along the first axis and a change in a moment M about a second axis perpendicular to the first axis measured by the force sensor (11) to determine a state of assembly of the workpiece (W1) with the part (W2).

2. A method for controlling a robot system (1) for inserting a workpiece (W1) including an engagement portion (23) into a part (W2) including a receiving portion (24) corresponding to the engagement portion (23) to assemble the workpiece (W1) with the part (W2), the method comprising:
controlling a robot (10) gripping the workpiece (W1) to move the workpiece (W1) in a direction along a first axis and insert the workpiece (W1) into the part (W2);
measuring a force F in the direction along the first axis and a moment M about a second axis perpendicular to the first axis using a force sensor (11) located on the robot (10); and
determining a state of assembly of the workpiece (W1) with the part (W2) by monitoring a change in the force F and a change in the moment M while inserting the workpiece (W1).

The invention claimed is:

1. A robot system for inserting a workpiece including an engagement portion into a part including a receiving portion corresponding to the engagement portion to assemble the workpiece with the part, the robot system comprising:
a robot configured to grip the workpiece;
a force sensor located on the robot to measure a force and a moment acting on the workpiece; and
a controller configured to control the robot, wherein:
the controller monitors, while moving the workpiece in a direction along a first axis and inserting the workpiece into the part, a change in a force F in the direction along the first axis and a change in a moment M about a second axis perpendicular to the first axis measured by the force sensor to determine a state of assembly of the workpiece with the part,
the controller determines that the engagement portion and the receiving portion are engaged with each other and that the workpiece is assembled with the part normally in response to a decrease in the force F relative to a maximum value Fmax of the force F recorded at and after a predetermined determination start point exceeding a first threshold, and
the controller determines that the workpiece is assembled with the part normally in response to the moment M being less than a second threshold and a predetermined time elapsing from the predetermined determination start point before the decrease in the force F relative to the maximum value Fmax of the force F exceeds the first threshold.

2. The robot system according to claim 1, wherein
the controller determines a state of engagement between the engagement portion and the receiving portion based on the change in the force F.

3. The robot system according to claim 1, wherein
the controller determines an appropriateness of an insertion orientation of the workpiece relative to the part based on the moment M.

4. The robot system according to claim 1, wherein
the controller determines that assembly of the workpiece is unsuccessful in response to the moment M remaining greater than or equal to the second threshold and the predetermined time elapsing from the predetermined determination start point before the decrease in the force F relative to the maximum value Fmax of the force F exceeds the first threshold.

5. The robot system according to claim 1, wherein
the predetermined time is set based on a time taken for the workpiece to reach an insertion end position from the predetermined determination start point.

6. The robot system according to claim 1, wherein
the controller performs a recovery operation to correct an insertion orientation of the workpiece in response to the moment M being greater than or equal to the second threshold before the decrease in the force F relative to the maximum value Fmax of the force F exceeds the first threshold.

7. The robot system according to claim 6, wherein
the recovery operation includes rotating the workpiece in a direction to reduce the moment M.

8. The robot system according to claim 6, wherein
the recovery operation includes moving the workpiece in a direction opposite to an insertion direction of the workpiece.

9. A method for controlling a robot system for inserting a workpiece including an engagement portion into a part including a receiving portion corresponding to the engagement portion to assemble the workpiece with the part, the method comprising:
controlling a robot gripping the workpiece to move the workpiece in a direction along a first axis and insert the workpiece into the part;
measuring a force F in the direction along the first axis and a moment M about a second axis perpendicular to the first axis using a force sensor located on the robot; and
determining a state of assembly of the workpiece with the part by monitoring a change in the force F and a change in the moment M while inserting the workpiece, wherein
it is determined that the engagement portion and the receiving portion are engaged with each other and that the workpiece is assembled with the part normally in response to a decrease in the force F relative to a maximum value Fmax of the force F recorded at and after a predetermined determination start point exceeding a first threshold, and
it is determined that the workpiece is assembled with the part normally in response to the moment M being less than a second threshold and a predetermined time elapsing from the predetermined determination start point before the decrease in the force F relative to the maximum value Fmax of the force F exceeds the first threshold.

* * * * *